(12) United States Patent
Oakes et al.

(10) Patent No.: US 7,025,678 B2
(45) Date of Patent: Apr. 11, 2006

(54) SYSTEM AND METHOD FOR EFFECTIVELY IMPLEMENTING REMOTE DISPLAY DEVICES IN A GAMING NETWORK

(75) Inventors: Mark E. Oakes, San Jose, CA (US); Ted M. Dunn, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 382 days.

(21) Appl. No.: 10/103,035

(22) Filed: Mar. 21, 2002

(65) Prior Publication Data

US 2003/0181241 A1 Sep. 25, 2003

(51) Int. Cl.
*A63F 13/00* (2006.01)

(52) U.S. Cl. .......................... 463/40; 463/31; 345/418; 345/619; 345/502; 345/2.3

(58) Field of Classification Search ................ 463/1, 463/30–31, 34, 39–42; 273/148 R, 148 B; 345/418, 619, 629–630, 634–635, 637, 698, 345/716, 718, 733, 751, 764–765, 767, 781, 345/788–790, 794–795, 802–803, 866, 501–502, 345/204, 1.1, 2.1, 2.2, 2.3, 415
See application file for complete search history.

(56) References Cited

U.S. PATENT DOCUMENTS

| | | | | |
|---|---|---|---|---|
| 4,572,509 A | * | 2/1986 | Sitrick | 463/31 |
| 4,926,327 A | * | 5/1990 | Sidley | 463/13 |
| 5,738,583 A | * | 4/1998 | Comas et al. | 463/40 |
| 5,956,485 A | * | 9/1999 | Perlman | 709/204 |
| 6,354,946 B1 | * | 3/2002 | Finn | 463/40 |
| 6,447,396 B1 | * | 9/2002 | Galyean et al. | 463/40 |
| 6,579,184 B1 | * | 6/2003 | Tanskanen | 463/41 |

OTHER PUBLICATIONS

Microsoft®Windows 98 Getting Started, 1999, Microsoft Corporation, 2nd Edition, p. 21.*

* cited by examiner

*Primary Examiner*—Scott Jones
(74) *Attorney, Agent, or Firm*—Gregory J. Koerner; Redwood Patent Law

(57) ABSTRACT

A system for implementing a gaming network includes a game console configured to generate game program signals corresponding to a gaming event, and a base unit coupled to the game console for processing the game program signals to produce a game program bitstream. The base unit may then wirelessly transmit the game program bitstream to various remote units which responsively process the game program bitstream to retrieve the foregoing game program signals. The remote units then each perform a pixel identification procedure to individually identify different assigned windows from the game program signals. The remote units also each perform a window zooming procedure to generate remote display video signals corresponding to the assigned windows. The remote units then each advantageously display one of the remote display video signals in a substantially full-screen manner upon respective remote displays coupled to the remote units.

44 Claims, 8 Drawing Sheets

SYSTEM AND METHOD FOR EFFECTIVELY IMPLEMENTING REMOTE DISPLAY DEVICES IN A GAMING NETWORK

BACKGROUND SECTION

1. Field of the Invention

This invention relates generally to techniques for implementing electronic gaming systems, and relates more particularly to a system and method for effectively implementing remote display devices in a gaming network.

2. Description of the Background Art

Developing effective methods for implementing electronic gaming systems is a significant consideration for designers and manufacturers of contemporary electronic entertainment systems. However, effectively implementing electronic gaming systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic gaming system that effectively supports video and audio content may benefit from an efficient implementation because of the large amount and complexity of the digital data involved.

Due to growing demands on system resources and substantially increasing data magnitudes, it is apparent that developing new techniques for implementing electronic gaming systems is a matter of concern for related electronic technologies. Therefore, for all the foregoing reasons, developing effective systems for implementing electronic gaming systems remains a significant consideration for designers, manufacturers, and users of contemporary electronic gaming systems.

SUMMARY

In accordance with the present invention, a system and method are disclosed for effectively implementing remote display devices in an electronic gaming network. In accordance with one embodiment of the present invention, one or more system users or other appropriate entities may preferably powerup a game console, a base unit, and various remote units from the electronic gaming network. Then, a primary communications channel to the remote units, and a back communications channel from the remote units may preferably be activated for operation.

Next, different window areas in video game programming from the game console may preferably be assigned to each remote unit by utilizing any effective techniques. The system users may then preferably initiate a particular gaming event in the electronic gaming network by utilizing any appropriate means. The game console may responsively begin to generate game program signals, including an audio signal and a video signal, to the base unit which may preferably process the audio signal and the video signal to produce a unified audio/video (A/V) packet stream. The base unit may then preferably transmit one unified A/V packet stream to all of the remote units. In certain embodiments, the base unit may alternately provide an analog broadcast of the game program signals to the remote units which may then responsively perform any further required processing of the analog broadcast. In addition, in various other embodiments, the remote units may receive the game program signals from the base unit or the game console through appropriate hardwired communication links.

The remote units may each preferably receive and process the unified A/V packet stream to retrieve the foregoing audio signal and video signal. Then, the remote units may each preferably identify and isolate pixels from respective assigned windows. The remote units may each also preferably expand the pixels from the respective assigned windows to generate corresponding remote display video signals. The remote units may next each preferably display one of the respective remote display video signals in a substantially full-screen manner on corresponding remote displays. The system users may then advantageously utilize the remote units to participate in the gaming event. The present invention therefore provides an improved system and method for effectively implementing remote display devices in an electronic gaming network.

DETAILED DESCRIPTION

The present invention relates to an improvement in electronic gaming techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively implementing remote display devices in an electronic gaming network, and may preferably include a game console configured to generate game program signals corresponding to a gaming event, and a base unit coupled to the game console for processing the game program signals to produce a game program bitstream. The base unit may then wirelessly transmit the game program bitstream to various remote units which may each be configured to receive the game program bitstream and responsively process the game program bitstream to retrieve the foregoing game program signals.

The remote units may then each perform a pixel identification procedure to individually identify different assigned windows from the game program signals. The remote units may also each perform a window zooming procedure to generate remote display video signals corresponding to the assigned windows. The remote units may then each advantageously display one of the remote display video signals in a substantially full-screen manner upon respective remote displays coupled to the remote units.

Figure 1:
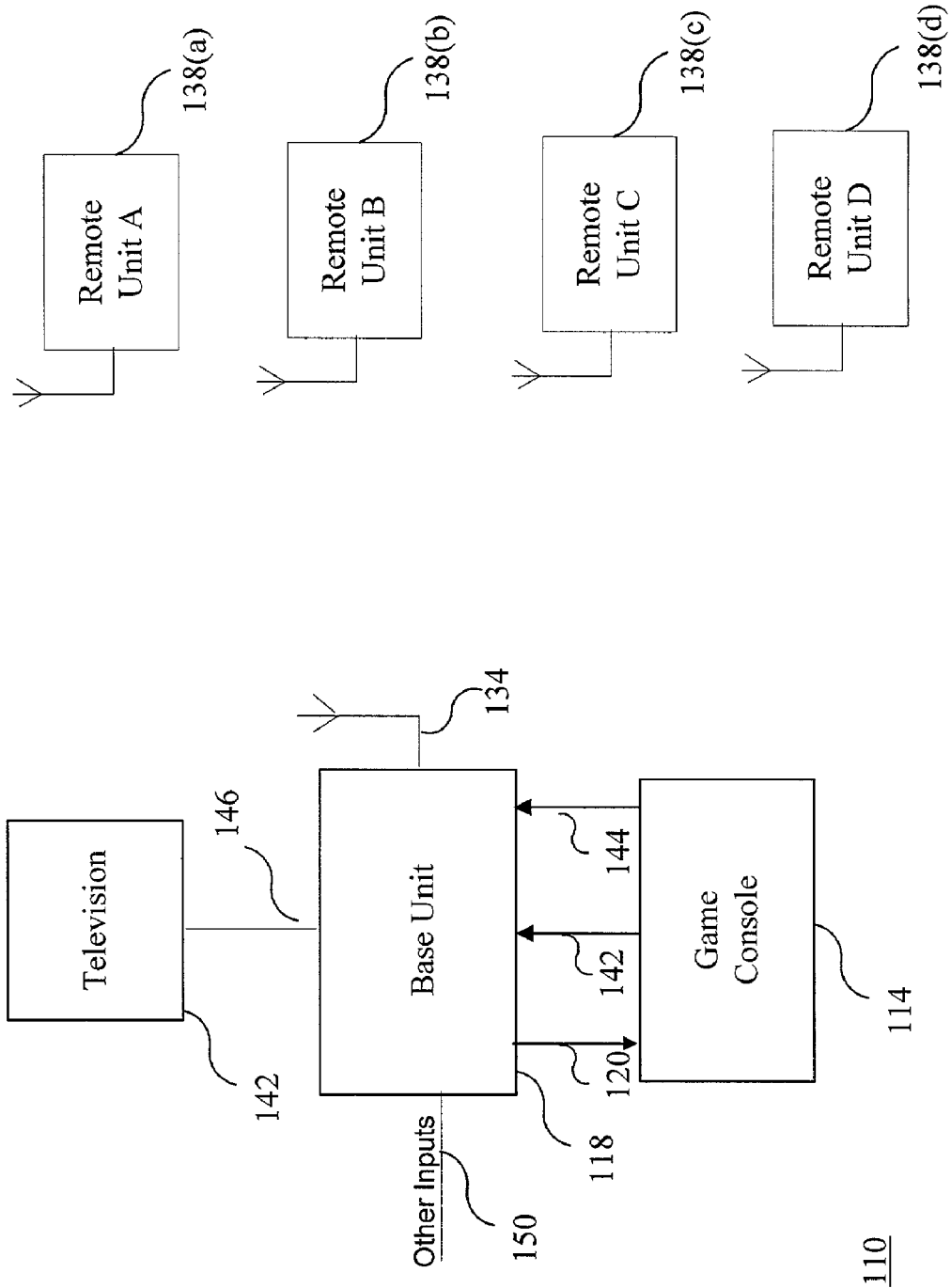
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, a game console 114, a base unit 118, a television 142, and several remote units 138. In alternate embodiments, electronic system 110 may readily be implemented using various components and configurations in addition to, or instead of, those discussed in conjunction with the FIG. 1 embodiment. For example, although the FIG. 1 embodiment is shown with four remote units 138(a) through 138(d), electronic system 110 may readily include any number of remote units 138.

In the FIG. 1 embodiment, game console 114 may preferably be implemented as any electronic device that is configured to support and manage various functionalities for participating in gaming activities with electronic system 110. For example, game console 114 may be implemented as a computer device that loads and executes various types of game software to generate a video signal to base unit 118 via path 142, as well as generating an audio signal to base unit 118 via path 144. In certain embodiments, game console 114 may be implemented as a Sony Playstation 2 device or other similar gaming device.

In the FIG. 1 embodiment, base unit 118 may preferably provide the video signal and audio signal to television 142 via path 146 as game programming. Base unit 118 may also receive other input signals via path 150. For example, in certain embodiments, other input signals on path 150 may include a cable television input, a television broadcasting receiver signal, or an Internet signal.

In the FIG. 1 embodiment, base unit 118 may preferably process the video signal and the audio signal from game console 114 to produce an audio/video (A/V) bitstream. Base unit may then wirelessly transmit the A/V bitstream to remote units 138(a) through 138(d) via antenna 134. Remote units 138(a) through 138(d) may then responsively receive the A/V bitstream, and may display selectable windows of the corresponding game programming on remote displays (not shown) coupled to remote units 138(a) through 138(d). In addition, in the FIG. 1 embodiment, remote units 138 may send various types of game control information back to base unit 118, which may responsively provide the game control information to game console 114 via path 120. The implementation and utilization of the FIG. 1 electronic system 110 is further discussed below in conjunction with FIGS. 2 through 7B.

Figure 2:
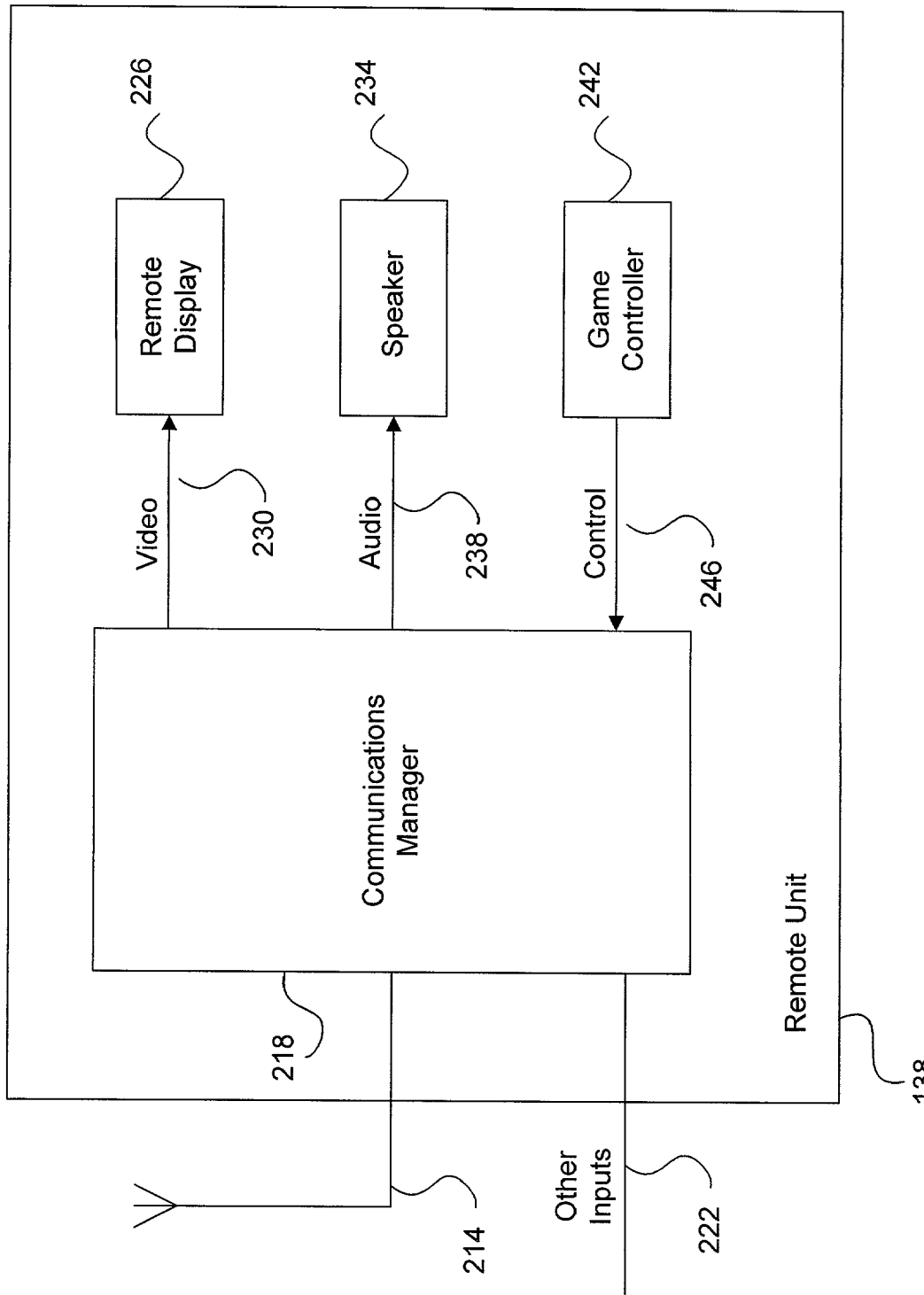
FIG. 2 is a block diagram for one embodiment of a remote unit from FIG. 1, in accordance with the present invention.

Referring now to FIG. 2, a block diagram for one embodiment of a FIG. 1 remote unit 138 is shown, in accordance with the present invention. In the FIG. 2 embodiment, remote unit 138 may preferably include, but is not limited to, a communication manager 218, a remote display 226, a speaker device 234, and a game controller 242. In alternate embodiments, remote unit 138 may readily be implemented using various components and configurations in addition to, or instead of, those discussed in conjunction with the FIG. 2 embodiment.

In the FIG. 2 embodiment, communications manager 218 may preferably include a transmit channel for transmitting information to base unit 118. Communication manager 218 may also include a receive channel for receiving information from base unit 118. One embodiment for implementing the foregoing transmit channel is discussed below in conjunction with FIG. 4. Similarly, one embodiment for implementing the foregoing receive channel is discussed below in conjunction with FIG. 3. In certain embodiments, base unit 118 may preferably include a base unit communications controller that is implemented by utilizing the same or similar architecture as that of communications manager 218 of remote units 138.

In the FIG. 2 embodiment, communications manager 218 may preferably receive an A/V bitstream from base unit 118 via antenna 214. Communications manager 218 may then preferably process the A/V bitstream and provide an appropriate video signal for display on remote display 226 via path 230. In the FIG. 2 embodiment, remote display 226 may be implemented by utilizing any effective technology, including, but not limited to, a liquid-crystal diode (LCD) screen or a cathode-ray tube (CRT) screen. Communications manager 218 may also preferably provide an appropriate audio signal via path 238 for reproduction by speaker device 234. In the FIG. 2 embodiment, speaker device 234 may be implemented by utilizing any effective technology, including, but not limited to, an audio power amplifier and a loudspeaker assembly.

In the FIG. 2 embodiment, game controller 242 may be implemented as any effective means for interacting with game console 114 to thereby participate a particular game or other interactive event. Game controller 242 may preferably provide control signals to communications manager 218 via path 246. Communications manager 218 may responsively transmit the foregoing control signals to game console 114 via base unit 118. In addition, communications manager 218 may similarly receive input signals via path 222. For example, communications manager 218 may receive input signals from data sources that include, but are not limited to, an electronic camera device, an electronic keypad, a memory stick device, an electronic network, or a computer device. Communications manager 218 may then responsively transmit the foregoing input signals to base unit 118.

In certain embodiments of the present invention, remote units 138 may be implemented without game controllers 242. In some embodiments, a system user may utilize a dedicated game controller from game console 114. In certain embodiments, remote units 138 may therefore be designed with a hardware device for attaching a particular remote unit 138 to one of the foregoing dedicated game controllers. The implementation and utilization of remote units 138 are further discussed below in conjunction with FIGS. 3 through 7B.

Figure 3:
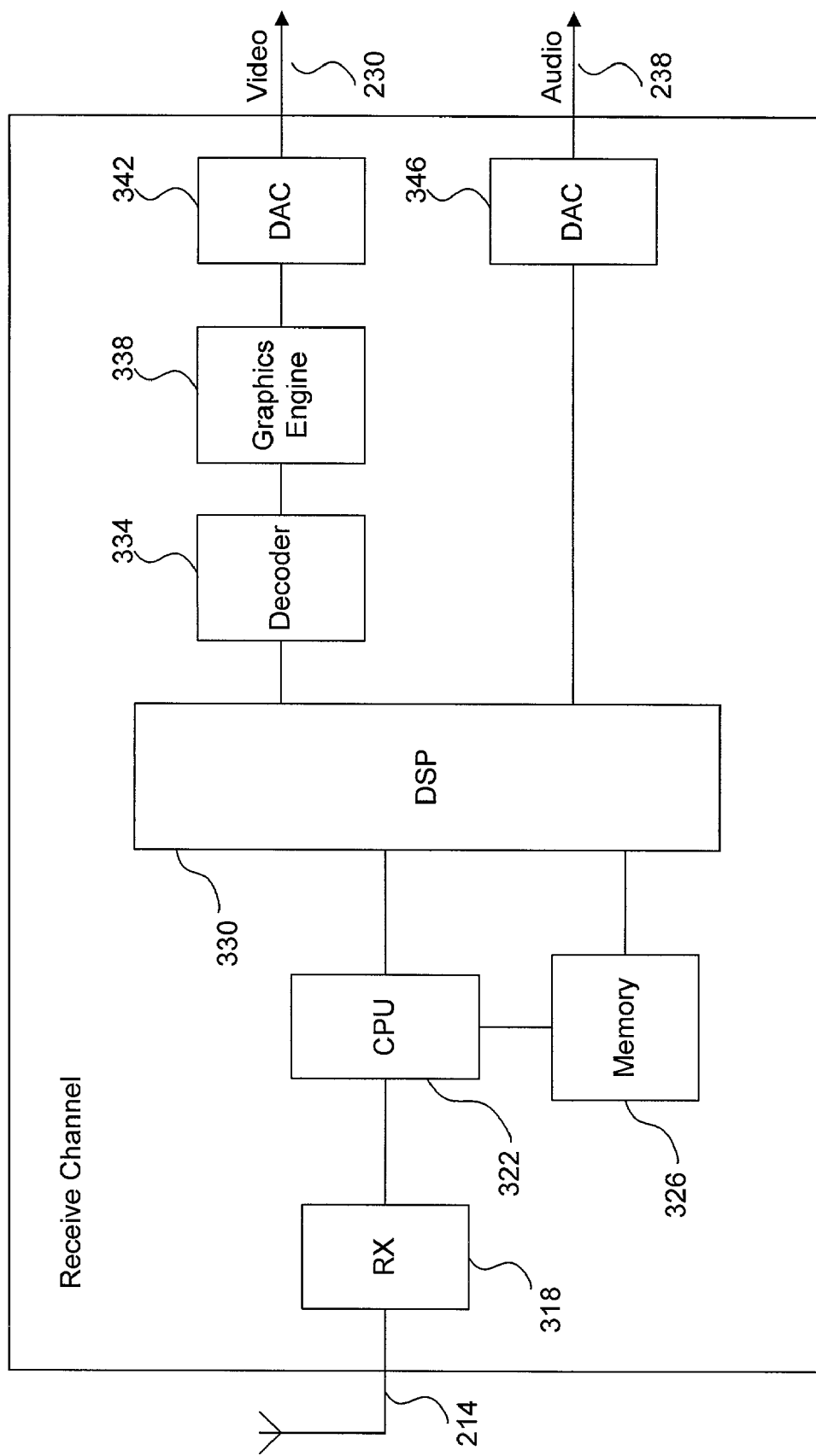
FIG. 3 is a block diagram for one embodiment of a receive channel from the communications manager of FIG. 2, in accordance with the present invention.

Referring now to FIG. 3, a block diagram for one embodiment of a receive channel 314 from the FIG. 2 communications manager 218 is shown, in accordance with the present invention. In the FIG. 3 embodiment, receive channel 314 may preferably include, but is not limited to, an antenna 214, a receiver (RX) 318, a central processing unit (CPU) 322, a memory 326, a digital signal processor (DSP) 330, a decoder 334, a graphics engine 338, a video digital-to-analog converter (DAC) 342, and an audio digital-to-analog converter (DAC) 346.

In alternate embodiments, receive channel 314 may readily be implemented using various components and configurations in addition to, or instead of, those discussed in conjunction with the FIG. 3 embodiment. In addition, in certain embodiments, base unit 118 (FIG. 1) may preferably include a base unit communications controller that has a base unit receiver device which is implemented by utilizing the same or similar architecture as that of the FIG. 3 receive channel 314.

In the FIG. 3 embodiment, a receiver (RX) 318 of receive channel 314 may preferably receive a radio-frequency transmission of an audio/video (A/V) bitstream from base unit 118 via antenna 214. Receiver 318 may preferably be implemented in any effective manner. For example, in certain embodiments, receiver 318 may preferably downconvert the A/V bitstream to a baseband frequency, and may then preferably provide the downconverted bitstream to CPU 322.

In the FIG. 3 embodiment, CPU 322 may be implemented to include any appropriate and compatible microprocessor device that preferably executes software instructions from memory 326 to thereby control and manage the operation of communications manager 218. In the FIG. 3 embodiment, memory 326 may be implemented to include any combination of desired storage devices, including, but not limited to, read-only memory (ROM), random-access memory (RAM), and various types of non-volatile memory, such as floppy disks, memory sticks, or hard disks. The contents and functionality of memory 326 are further discussed below in conjunction with FIG. 5.

In the FIG. 3 embodiment, CPU 322 may preferably provide the A/V bitstream to DSP 330 which may then preferably process and depacketize the A/V bitstream to produce a digital video signal and a separate digital audio signal. In the FIG. 3 embodiment, DSP 330 may preferably provide the processed digital audio signal to DAC 346 which may responsively generate a corresponding analog audio signal to speaker device 234 (FIG. 2) of remote unit 138.

In addition, in the FIG. 3 embodiment, DSP 330 may provide the processed digital video signal to a decoder 334 which preferably generates a decoded digital video signal. In certain embodiments, decoder 334 may preferably upconvert the bitrate of the processed digital video signal to produce the decoded digital video signal. Decoder 334 may then preferably provide the decoded digital video signal to a graphics engine 338 for additional processing in accordance with the present invention.

For example, in certain embodiments, graphics engine 338 may preferably identify and isolate a particular window of picture elements (pixels) from the decoded digital video signal based upon a prior assignment of that specific window to a particular remote unit 138. Graphics engine 338 may preferably also expand the pixels from the foregoing assigned window to generate a digital remote display signal for a substantially full-screen presentation on remote display 226 (FIG. 2) of remote unit 138. The utilization of graphics engine 338 to isolate and expand pixels from a particular assigned window is further discussed below in conjunction with FIGS. 6, 7A, and 7B. Graphics engine 338 may then preferably provide the digital remote display signal to an audio digital-to-analog converter (DAC) 346 which may responsively generate a corresponding analog remote display signal to remote display 226 (FIG. 2) of remote unit 138 via path 230.

In embodiments where base unit 118 is configured to include a base unit receive channel similar to that of the FIG. 3 receive channel 314, base unit 118 may advantageously receive various types of game control signals and other information from remote unit 138. Base unit 118 may then preferably provide the received game control signals to game console 114 to thereby allow system users to interactively participate in various gaming events. Furthermore, receive channel 314 may be utilized to receive any type of information or data in addition to, or instead of, the audio signals and video signals discussed above in conjunction with the FIG. 3 embodiment.

Figure 4:
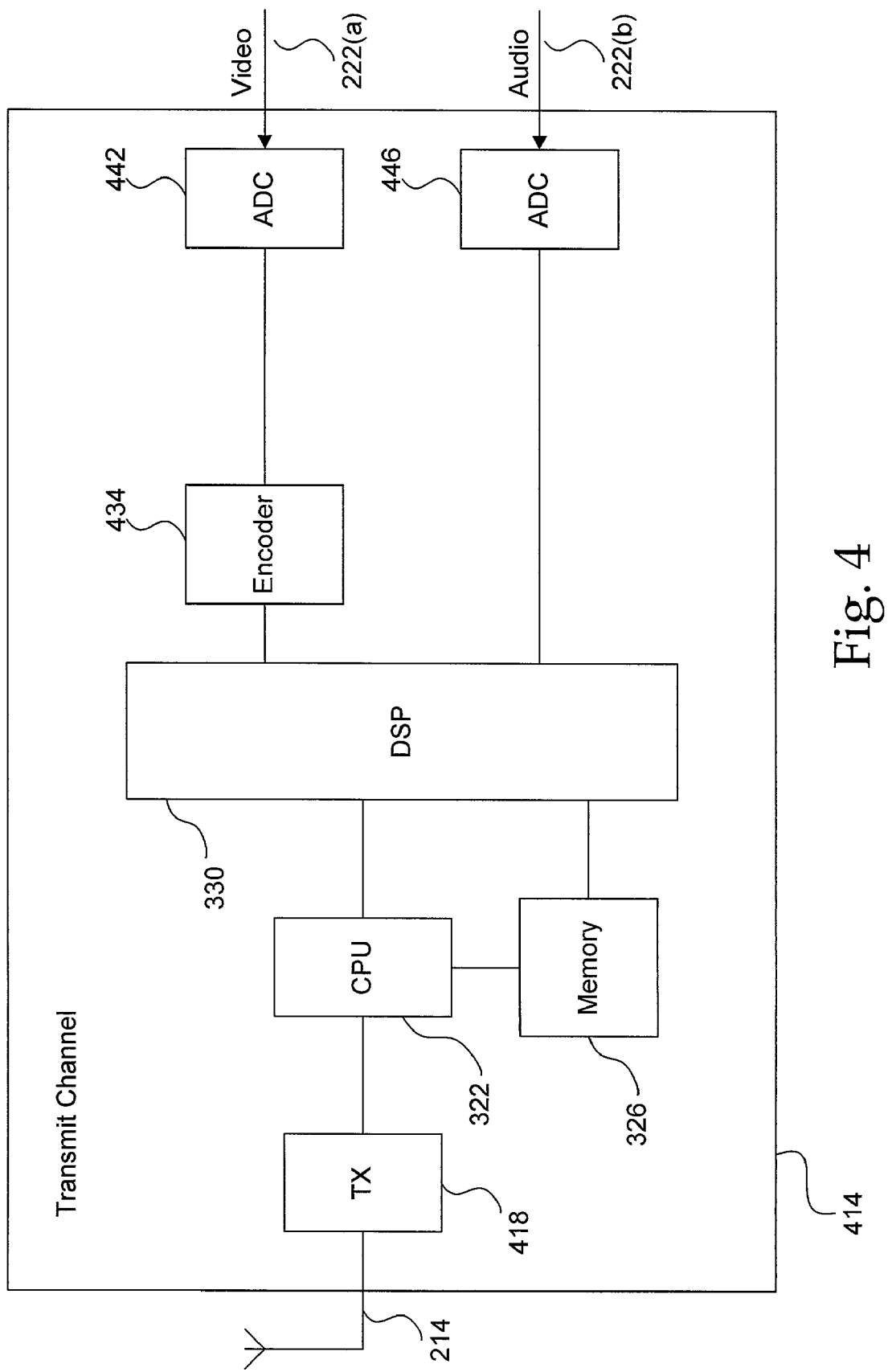
FIG. 4 is a block diagram for one embodiment of a transmit channel from the communications manager of FIG. 2, in accordance with the present invention.

Referring now to FIG. 4, a block diagram for one embodiment of a transmit channel 414 from the FIG. 2 communications manager 218 is shown, in accordance with the present invention. In the FIG. 4 embodiment, transmit channel 414 may preferably include, but is not limited to, an antenna 214, a transmitter (TX) 418, a central processing unit (CPU) 322, a memory 326, a digital signal processor (DSP) 330, an encoder 434, a video analog-to-digital converter (ADC) 442, and an audio analog-to-digital converter (ADC) 446.

In alternate embodiments, transmit channel 414 may readily be implemented using various components and configurations in addition to, or instead of, those discussed in conjunction with the FIG. 4 embodiment. In addition, in certain embodiments, base unit 118 (FIG. 1) may preferably include a base unit communications controller that has a base unit transmitter device which is implemented by utilizing the same or similar architecture as that of the FIG. 4 transmit channel 414.

In the FIG. 4 embodiment, an audio source (such as other inputs 222 of FIG. 2) may preferably provide an analog audio signal to an audio analog-to-digital converter (ADC) 446 which may responsively generate a corresponding digital audio signal to DSP 330 of remote unit 138. Similarly, a video source (such as other inputs 222 of FIG. 2) may preferably provide an analog video signal to a video analog-to-digital converter (ADC) 442 which may responsively generate a corresponding digital video signal to encoder 434 of remote unit 138.

In the FIG. 4 embodiment, encoder 434 may responsively generate an encoded digital video signal from the received digital video signal from ADC 442. In certain embodiments, encoder 434 may preferably downconvert the bitrate of the digital video signal to produce the encoded digital video signal. Encoder 434 may preferably then provide the encoded digital video signal to DSP 330 for additional processing in accordance with the present invention. In the FIG. 4 embodiment, DSP 330 may preferably process and packetize the foregoing encoded digital video signals and the digital audio signals to produce a unified A/V bitstream. DSP 330 may then provide the A/V bitstream to CPU 332.

In the FIG. 4 embodiment, CPU 322 may be implemented to include any appropriate and compatible microprocessor device that preferably executes software instructions from memory 326 to thereby control and manage the operation of communications manager 218. In the FIG. 4 embodiment, memory 326 may be implemented to include any combination of desired storage devices, including, but not limited to, read-only memory (ROM), random-access memory (RAM), and various types of non-volatile memory, such as floppy disks, memory sticks, or hard disks. The contents and functionality of memory 326 are further discussed below in conjunction with FIG. 5. In certain embodiments, DSP 330, CPU 332, and memory 326 of FIG. 4 may be implemented by using the same components as those similarly named and numbered components from the receive channel 314 of FIG.

3, so that receive channel 314 and transmit channel 414 may economically share these components.

In the FIG. 4 embodiment, CPU 322 may preferably provide the A/V bitstream to a transmitter (TX) 418 of transmit channel 414 to generate a radio-frequency transmission of the audio/video (A/V) bitstream to base unit 118 via antenna 214. Transmitter 418 may preferably be implemented in any effective manner. For example, in certain embodiments, transmitter 418 may preferably upconvert the A/V bitstream to a transmit frequency, and then may preferably transmit the upconverted bitstream to base unit 118.

In embodiments where base unit 118 is configured to include a base unit transmit channel similar to that of the FIG. 4 transmit channel 414, base unit 118 may advantageously receive various types of audio signals, video signals, and other information from game console 114. Base unit 118 may preferably then transmit the received audio signals, video signals, and other information to remote unit 138 to thereby allow system users to participate in various gaming events. Furthermore, transmit channel 414 may be utilized to transmit any type of information or data in addition to, or instead of, the audio signals and video signals discussed above in conjunction with the FIG. 4 embodiment. For example, transmit channel 414 may transmit control signals from game controller 242 (FIG. 2).

Figure 5:
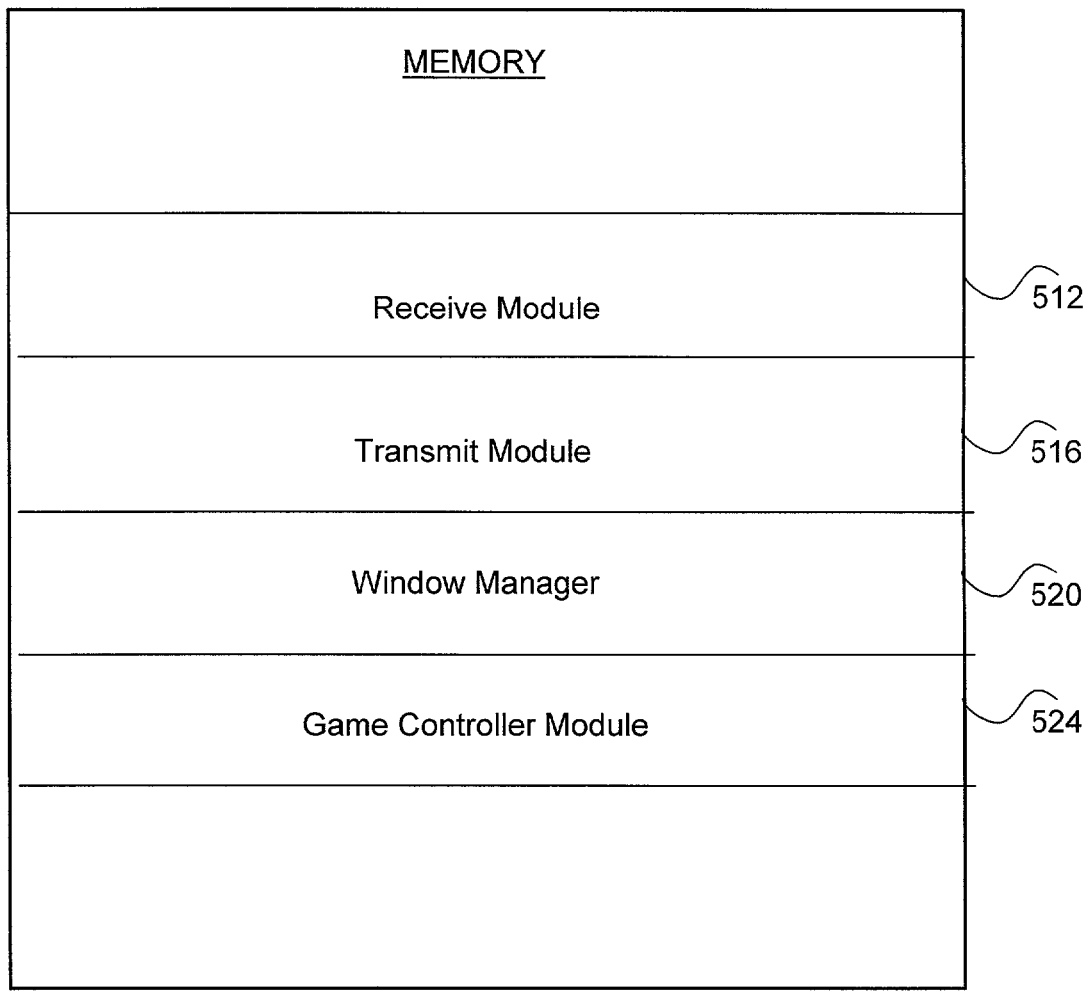
FIG. 5 is a block diagram for one embodiment of the memory of FIGS. 3 and 4, in accordance with the present invention.

Referring now to FIG. 5, a block diagram for one embodiment of memory 326 from FIGS. 3 and 4 is shown, in accordance with the present invention. In the FIG. 5 embodiment, memory 326 may preferably include, but is not limited to, a receive module 512, a transmit module 516, a window manager 520, and a game controller module 524. In alternate embodiments, memory 326 may readily be implemented using various components and configurations in addition to, or instead of, those discussed in conjunction with the FIG. 5 embodiment.

In the FIG. 5 embodiment, receive module 512 may include program instructions that are preferably executed by CPU 322 (FIG. 3) to perform various functions and operations for receive channel 314. The particular nature and functionality of receive module 512 preferably varies depending upon factors such as the specific type and particular functionality of the corresponding receive channel 314. Similarly, transmit module 516 may include program instructions that are preferably executed by CPU 322 (FIG. 4) to perform various functions and operations for transmit channel 414. The particular nature and functionality of transmit module 516 preferably varies depending upon factors such as the specific type and particular functionality of the corresponding transmit channel 414.

In the FIG. 5 embodiment, window manager 520 may preferably coordinate and manage various functions for assigning and generating a substantially full-screen image from a particular game window in A/V information provided by game console 114, in accordance with the present invention. The functionality and utilization of window manager 520 are further discussed below in conjunction with FIGS. 6, 7A, and 7B. In the FIG. 5 embodiment, game controller module 524 may preferably control and manage the utilization of game controllers 242 (FIG. 2) by system users.

In the FIG. 5 embodiment, receive module 512, transmit module 516, window manager 520, and game controller module 524 are disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein.

Figure 6:
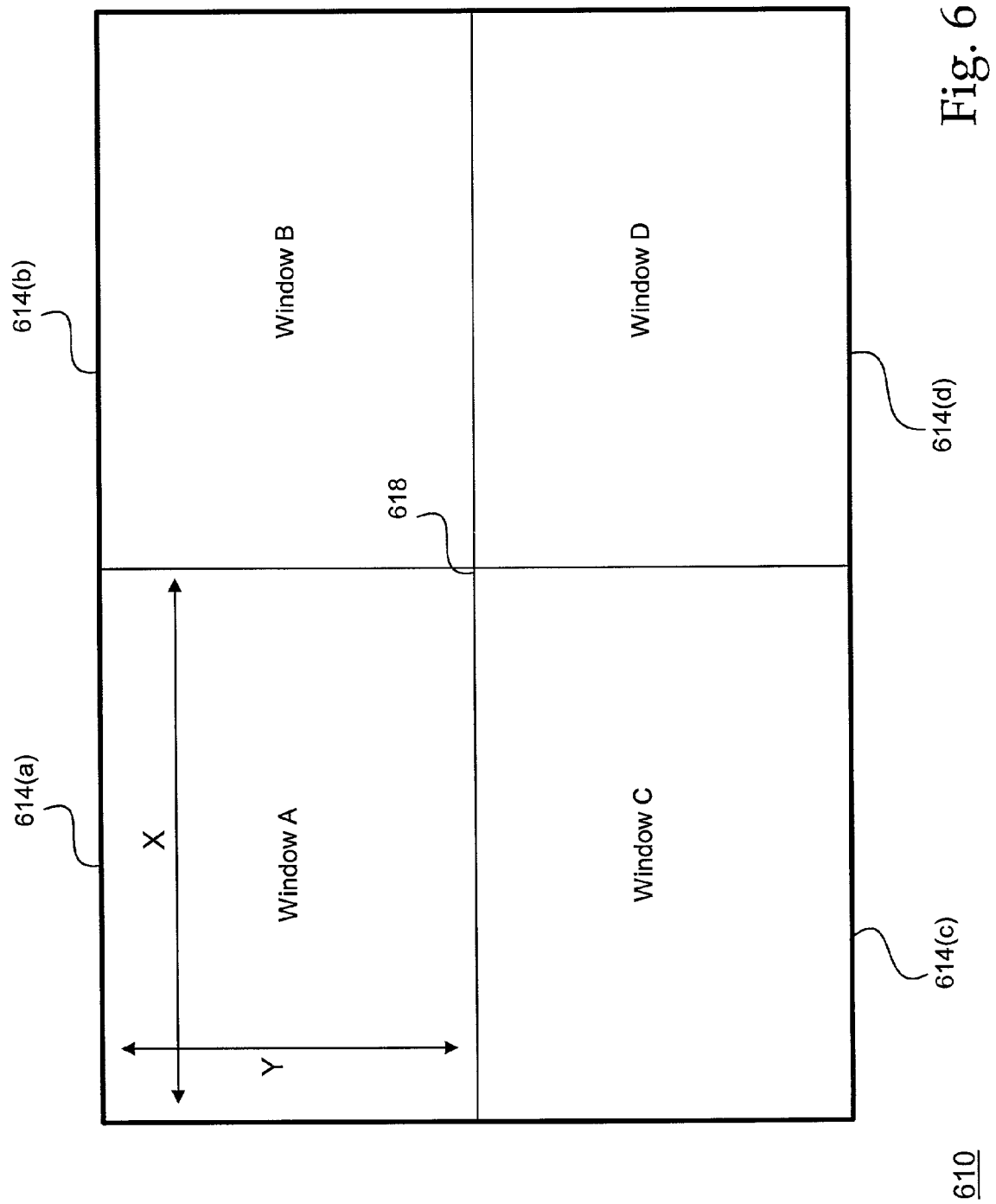
FIG. 6 is a block diagram for one embodiment of a split-screen display generated by the game console of FIG. 1, in accordance with the present invention.

Referring now to FIG. 6, a block diagram of a split-screen display 610 generated by the FIG. 1 game console 114 is shown, in accordance with one embodiment of the present invention. In the FIG. 6 embodiment, split-screen display 610 may preferably include, but is not limited to, a window A 614(a), a window B 614(b), a window C 614(c), and a window D 614(d). In the FIG. 6 embodiment, split-screen 610 may preferably also include one or more window positioning points 618.

Split-screen 610 of FIG. 6 is shown as a four-way split-screen display. However, in alternate embodiments, split-screen display 610 may readily be implemented by utilizing various elements and configurations in addition to, or instead of, those discussed in conjunction with the FIG. 6 embodiment. For example, in alternate embodiments, split-screen 610 may readily be implemented to include any desired number of windows 614 that may be shaped and/or positioned in any desired manner.

In the FIG. 6 embodiment, in order to isolate and display a particular window 614 full-screen on remote display 226 (FIG. 2) of remote unit 138, window manager 520 (FIG. 5) may preferably cause graphics engine 338 (FIG. 3) to initially identify and isolate pixels from a window 614 that was previously assigned to a corresponding remote unit 138 during a window assignment procedure that may initially be conducted between game console 114 and remote units 138.

The foregoing window assignment procedure may be conducted in any effective manner. For example, windows 614 may be assigned to different remote units 138 based upon system user inputs from game controllers 242 on a first-come first-served basis, or alternately, windows 614 may be assigned to different remote units 138 on a random basis. In addition, windows 614 may be assigned to different remote units 138 based upon various types of pre-determined window assignment criteria.

For example, windows 614 may be assigned to different remote units 138 based upon respective identifiers stored in the remote units 138, such as unit serial numbers or other numerical identifiers. In certain embodiments, system users may also negotiate with other system users to specify or alter assignments of windows 614. In certain embodiments, specific windows 614 may be pre-assigned to corresponding remote units 138 or game controllers 242. In the FIG. 6 embodiment, each remote unit 138 may preferably store or access a window identifying parameter that specifies which particular window 138 has been assigned to that remote unit 138.

In the FIG. 6 embodiment, window manager 520 may preferably cause graphics engine 338 to perform a pixel identification procedure to thereby identify and isolate pixels from a given window 614 by utilizing any effective techniques. For example, window manager 520 may preferably identify the assigned window 614 by referencing the foregoing window identifying parameter. Window manager 520 may preferably then determine a horizontal pixel count (in an "X" direction) and a vertical pixel count (in a "Y" direction) by utilizing any appropriate means. For example, in certain embodiments, window manager 520 may store window boundary information from game console 114 or another appropriate source for an assigned window 614 from split-screen 610.

In addition, in certain embodiments, remote unit 138 may store one or more window positioning points 618 for various gaming events. System users may utilize remote units 138 to reposition the one or more window positioning points 618 to thereby adjust and vary the shape of one or more of the windows 614 in split-screen 610. In the FIG. 6 example, if split-screen 610 has a total of 320 pixels in a horizontal direction, and a total of 192 pixels in a vertical direction, and if the location of window positioning point 618 causes each window 614 to be identically sized, then window manager 520 may preferably determine that window A 614(*a*) has 160 pixels in a horizontal X direction, and also has 96 pixels in a vertical Y direction.

In the FIG. 6 embodiment, window manager 520 may preferably then cause graphics engine 338 to perform a window zooming procedure to thereby expand pixels from assigned window 614 to appropriately generate a remote display video signal for full-screen (or substantially full-screen) presentation on remote display 226 of remote unit 138. In the foregoing example in which window A 614(*a*) has 160 pixels in a horizontal X direction, and also has 96 pixels in a vertical Y direction, window manager 520 may preferably cause graphics engine 338 to individually replicate each pixel from assigned window 614 in a horizontal X direction for an entire pixel line in window A 614(*a*) to produce an expanded pixel line.

Window manager 520 may then cause graphics engine 338 to duplicate the entire expanded pixel line in a line location that is immediately adjacent to the original expanded pixel line. Window manager 520 may then cause graphics engine 338 to repeatedly create and duplicate expanded pixel lines for all remaining pixels in assigned window A 614(*a*) to thereby generate the foregoing remote display video signal. Receive channel 314 of remote unit 138 may then advantageously provide the remote display video signal for presentation on remote display 226 of remote unit 138, in accordance with the present invention.

Figure 7A:
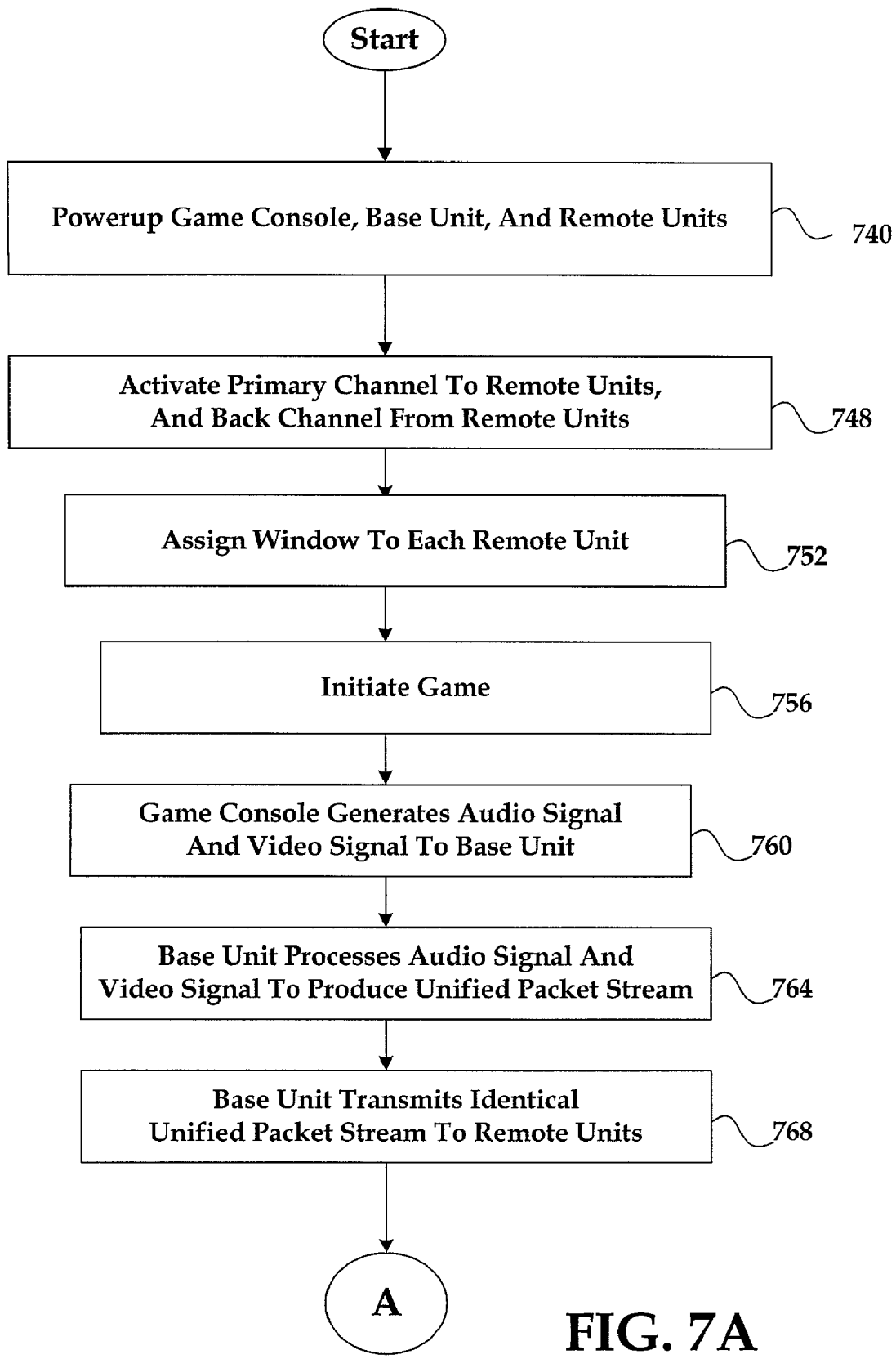
FIG. 7A is a flowchart of initial method steps for utilizing remote display devices in an electronic gaming network, in accordance with one embodiment of the present invention.

Referring now to FIG. 7A, a flowchart of initial method steps for utilizing remote display devices 226 in an electronic gaming network is shown, in accordance with one embodiment of the present invention. The FIG. 7A example is presented for purposes of illustration, and in alternate embodiments, the present invention may readily utilize various steps and sequences other than those discussed in conjunction with the FIG. 7A embodiment.

In the FIG. 7A embodiment, in step 740, one or more system users or other appropriate entities may preferably powerup game console 114, base unit 118, and one or more remote units 138. In step 748, a primary communications channel to remote units 138, and a back communications channel from remote units 138 may preferably be activated for operation. In step 752, various selected windows 614 may preferably be assigned to remote units 138, as discussed above in conjunction with FIG. 6. Then, in step 756, system users may preferably initiate a particular gaming event by utilizing any appropriate means.

In the FIG. 7A embodiment, in step 760, game console 114 may preferably generate game program signals including an audio signal and a video signal to base unit 118. Then, in step 764, base unit 118 may preferably process the audio signal and the video signal to produce a unified A/V packet stream. In step 768, base unit 118 may then preferably transmit an identical unified A/V packet stream to all remote units 138. The FIG. 7A process may then preferably advance to step 772 of FIG. 7B (letter "A").

Figure 7B:
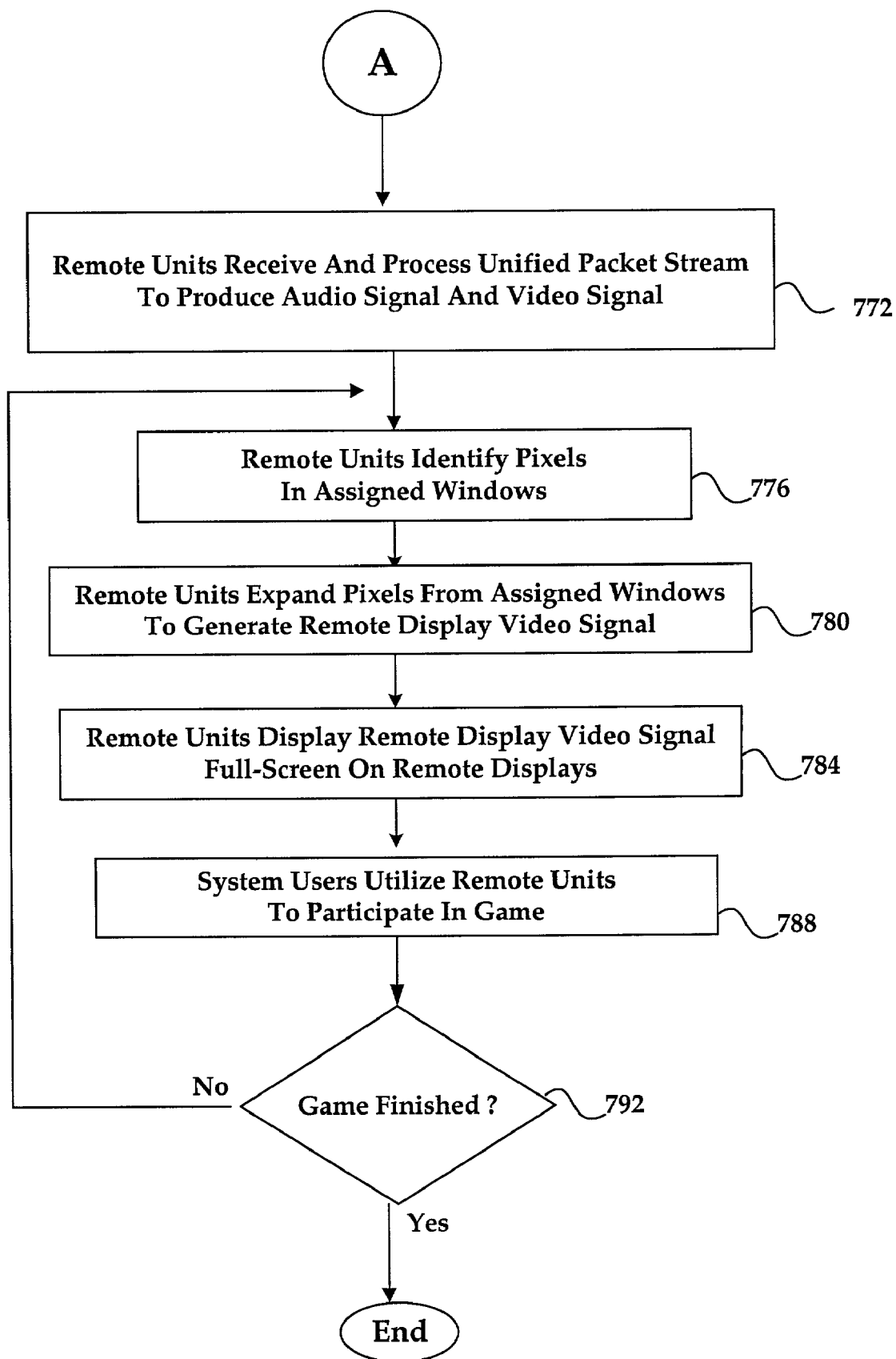
FIG. 7B is a flowchart of final method steps for utilizing remote display devices in an electronic gaming network, in accordance with one embodiment of the present invention.

Referring now to FIG. 7B, a flowchart of final method steps for utilizing remote display devices in an electronic gaming network is shown, in accordance with one embodiment of the present invention. The FIG. 7B example is presented for purposes of illustration, and in alternate embodiments, the present invention may readily utilize various steps and sequences other than those discussed in conjunction with the FIG. 7B embodiment.

In the FIG. 7B embodiment, in step 772, remote units 138 may preferably receive and process the unified A/V packet stream to retrieve the foregoing audio signal and video signal from FIG. 7A. Then, in step 776, remote units 138 may preferably identify and isolate pixels in respective assigned windows 614. Next, in step 780, remote units 138 may preferably expand pixels from the respective assigned windows 614 to generate remote display video signals.

In step 784, remote units 138 may each preferably display one of the respective remote display video signals in a substantially full-screen manner on remote displays 226. Then, in step 788, system users may advantageously utilize remote units 138 to participate in the particular gaming event. In step 792, remote units 138 may preferably determine whether the current gaming event is finished. If the current gaming event is not finished, then the FIG. 7B process may preferably return to foregoing step 776 to continue processing and displaying the respective assigned windows 614 on corresponding remote displays 226. However, if the current gaming event is finished, then the FIG. 7B process may preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing an electronic gaming system, comprising:
   a game console configured to generate game program signals corresponding to a gaming event;
   a base unit coupled to said game console for processing said game program signals to produce a game program bitstream, said base unit then wirelessly transmitting said game program bitstream; and
   remote units configured to receive said game program bitstream, said remote units each responsively processing said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units.

2. The system of claim 1 wherein said game console is implemented as a computer device that loads and executes various types of game software to generate said game program signals, said base unit being implemented to include a transmitter-receiver device for propagating said game program signals to said remote units, said base unit also providing game control signals from said remote devices to said game console.

3. The system of claim 1 wherein said remote units each include an antenna, other inputs, a communications manager, said remote display, and a speaker device.

4. The system of claim 3 wherein said remote units each further include a game controller that a system user may utilize to provide control signals to said game controller for interactively participating in said gaming event.

5. The system of claim 3 wherein said communications manager includes a receive channel and a transmit channel, said receive channel including said antenna, a receiver device, a central processing unit coupled to a memory device, a digital signal processor, a video decoder, a graphics engine, a video digital-to-analog converter, and an audio digital-to-analog converter, said transmit channel including an audio analog-to-digital converter, a video analog-to-digital converter, a video encoder, said digital signal processor, said central processing unit coupled to said memory device, a transmitter device, and said antenna, said memory device including receive software, transmit software, window manager software, and game controller software.

6. The system of claim 1 wherein said game program signals generated by said game console include video information corresponding to a four-way split-screen for a television device coupled to said base unit, said four-way split-screen including four of said assigned windows that each corresponds to a different one of said remote devices.

7. The system of claim 1 wherein operating power is provided to said game console, said base unit, and said remote units, said game console, said base unit, and said remote units responsively activating a primary communications channel from said game console to each of said remote units through said base unit, said game console, said base unit, and said remote units also activating a back communications channel from each of said remote units to said game console through said base unit.

8. The system of claim 7 wherein a window assignment procedure is initially performed between said game console and said remote units to thereby uniquely specify said assigned windows from said game video signal for each of said remote units.

9. The system of claim 8 wherein said assigned windows are determined by referencing and comparing respective numerical identifiers corresponding to said remote units.

10. The system of claim 8 wherein said game console generates an audio signal and a video signal to said base unit, said base unit responsively processing said audio signal and said video signal to produce a unified A/V packet stream, said base unit then wirelessly transmitting said unified A/V packet stream to said remote units in an identical manner.

11. The system of claim 10 wherein said remote units each receive and process said unified A/V packet stream to retrieve said audio signal and said video signal.

12. The system of claim 11 wherein said remote units each identify one of said assigned windows, and then isolate pixels in said one of said assigned windows.

13. The system of claim 12 wherein said remote units each identify said one of said assigned windows by referencing a stored window identifying parameter that specifies said one of said assigned windows.

14. The system of claim 12 wherein said remote units each isolate said pixels in said one of said assigned windows by referencing stored window boundary values.

15. The system of claim 12 wherein said remote units each perform said window zooming procedure to expand said pixels to generate said one of said remote display video signals.

16. The system of claim 15 wherein said remote units each present said one of said remote display signals in a substantially full-screen manner upon a corresponding one of said respective remote displays.

17. The system of claim 15 wherein system users utilize a back communications channel to communicate with said game console with game controllers to thereby interactively participate in said gaming event.

18. The system of claim 1 wherein said remote units each store one or more window positioning points for a current gaming event, said remote units each selectively repositioning said one or more window positioning points to thereby adjust and vary a shape of one or more of said assigned windows.

19. A system for implementing an electronic gaming system, comprising:
   a game console configured to generate game program signals corresponding to a gaming event;
   a base unit coupled to said game console for processing said game program signals to produce a game program bitstream, said base unit then wirelessly transmitting said game program bitstream; and
   remote units configured to receive said game program bitstream, said remote units each responsively processing said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units, said remote units each including an antenna, other inputs, a communications manager, said remote display, and a speaker device, said communications manager including a receive channel and a transmit channel, said receive channel including said antenna, a receiver device, a central processing unit coupled to a memory device, a digital signal processor, a video decoder, a graphics engine, a video digital-to-analog converter, and an audio digital-to-analog converter, said transmit channel including an audio analog-to-digital converter, a video analog-to-digital converter, a video encoder, said digital signal processor, said central processing unit coupled to said memory device, a transmitter device, and said antenna, said memory device including receive software, transmit software, window manager software, and game controller software, said base unit including a separate communications unit that is configured with a substantially similar implementation as that of said communications manager.

20. A system for implementing an electronic gaming system, comprising:
   a game console configured to generate game program signals corresponding to a gaming event;
   a base unit coupled to said game console for processing said game program signals to produce a game program bitstream, said base unit then wirelessly transmitting said game program bitstream; and
   remote units configured to receive said game program bitstream, said remote units each responsively processing said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units, operating power being provided to said game console, said base unit, and said remote units, said game console, said base unit, and said remote units responsively activating a primary communications channel from said game console to each of said remote units through said base unit, said game console, said base unit, and said remote units also activating a back communications channel from each of said remote units to said game console through said base unit, a window assignment procedure being initially performed between said game console and said remote units to thereby uniquely specify said assigned windows from said game video signal for each of said remote units, said assigned windows being determined based upon system user inputs from game controllers on a first-come first-served basis, said assigned windows being changeable following negotiations between said system users.

21. A method for implementing an electronic gaming system, comprising the steps of:
generating game program signals corresponding to a gaming event by utilizing a game console;
processing said game program signals with a base unit to produce a game program bitstream, said base unit then wirelessly transmitting said game program bitstream; and
receiving said game program bitstream by utilizing remote units that each responsively process said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units.

22. The method of claim 21 wherein said game console is implemented as a computer device that loads and executes various types of game software to generate said game program signals, said base unit being implemented to include a transmitter-receiver device for propagating said game program signals to said remote units, said base unit also providing game control signals from said remote devices to said game console.

23. The method of claim 21 wherein said remote units each include an antenna, other inputs, a communications manager, said remote display, and a speaker device.

24. The method of claim 23 wherein said remote units each further include a game controller that a system user may utilize to provide control signals to said game controller for interactively participating in said gaming event.

25. The method of claim 23 wherein said communications manager includes a receive channel and a transmit channel, said receive channel including said antenna, a receiver device, a central processing unit coupled to a memory device, a digital signal processor, a video decoder, a graphics engine, a video digital-to-analog converter, and an audio digital-to-analog converter, said transmit channel including an audio analog-to-digital converter, a video analog-to-digital converter, a video encoder, said digital signal processor, said central processing unit coupled to said memory device, a transmitter device, and said antenna, said memory device including receive software, transmit software, window manager software, and game controller software.

26. The method of claim 21 wherein said game program signals generated by said game console include video information corresponding to a four-way split-screen for a television device coupled to said base unit, said four-way split-screen including four of said assigned windows that each corresponds to a different one of said remote devices.

27. The method of claim 21 wherein operating power is provided to said game console, said base unit, and said remote units, said game console, said base unit, and said remote units responsively activating a primary communications channel from said game console to each of said remote units through said base unit, said game console, said base unit, and said remote units also activating a back communications channel from each of said remote units to said game console through said base unit.

28. The method of claim 27 wherein a window assignment procedure is initially performed between said game console and said remote units to thereby uniquely specify said assigned windows from said game video signal for each of said remote units.

29. The method of claim 28 wherein said assigned windows are determined by referencing and comparing respective numerical identifiers corresponding to said remote units.

30. The method of claim 28 wherein s aid game console generates an audio signal and a video signal to said base unit, said base unit responsively processing said audio signal and said video signal to produce a unified A/V packet stream, said base unit then wirelessly transmitting s aid unified A/V packet stream to said remote units in an identical manner.

31. The method of claim 30 wherein said remote units each receive and process said unified A/V packet stream to retrieve said audio signal and said video signal.

32. The method of claim 31 wherein said remote units each identify one of said assigned windows, and then isolate pixels in said one of said assigned windows.

33. The method of claim 32 wherein said remote units each identify said one of said assigned windows by referencing a stored window identifying parameter that specifies said one of said assigned windows.

34. The method of claim 32 wherein said remote units each isolate said pixels in said one of said assigned windows by referencing stored window boundary values.

35. The method of claim 32 wherein said remote units each perform said window zooming procedure to expand said pixels to generate said one of said remote display video signals.

36. The method of claim 35 wherein said remote units each present said one of said remote display signals in a substantially full-screen manner upon a corresponding one of said respective remote displays.

37. The method of claim 35 wherein system users utilize a back communications channel to communicate with said game console with game controllers to thereby interactively participate in said gaming event.

38. The method of claim 21 wherein said remote units each store one or more window positioning points for a current gaming event, said remote units each selectively repositioning said one or more window positioning points to thereby adjust and vary a shape of one or more of said assigned windows.

39. A method for implementing an electronic gaming system, comprising the steps of:
generating game program signals corresponding to a gaming event by utilizing a game console;

processing said game program signals with a base unit to produce a game program bitstream, said base unit then wirelessly transmitting said game program bitstream; and receiving said game program bitstream by utilizing remote units that each responsively process said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units, said remote units each including an antenna, other inputs, a communications manager, said remote display, and a speaker device, said communications manager including a receive channel and a transmit channel, said receive channel including said antenna, a receiver device, a central processing unit coupled to a memory device, a digital signal processor, a video decoder, a graphics engine, a video digital-to-analog converter, and an audio digital-to-analog converter, said transmit channel including an audio analog-to-digital converter, a video analog-to-digital converter, a video encoder, said digital signal processor, said central processing unit coupled to said memory device, a transmitter device, and said antenna, said memory device including receive software, transmit software, window manager software, and game controller software, said base unit including a separate communications unit that is configured with a substantially similar implementation as that of said communications manager.

40. A method for implementing an electronic gaming system, comprising the steps of:
generating game program signals corresponding to a gaming event by utilizing a game console;
processing said game program signals with a base unit to produce a game program bitstream, said base unit then wirelessly transmitting said game program bitstream; and
receiving said game program bitstream by utilizing remote units that each responsively process said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units, operating power being provided to said game console, said base unit, and said remote units, said game console, said base unit, and said remote units responsively activating a primary communications channel from said game console to each of said remote units through said base unit, said game console, said base unit, and said remote units also activating a back communications channel from each of said remote units to said game console through said base unit, a window assignment procedure being initially performed between said game console and said remote units to thereby uniquely specify said assigned windows from said game video signal for each of said remote units, said assigned windows being determined based upon system user inputs from game controllers on a first-come first-served basis, said assigned windows being changeable following negotiations between said system users.

41. A computer-readable medium comprising program instructions for implementing an electronic gaming system by performing the steps of:
generating game program signals corresponding to a gaming event by utilizing a game console;
processing said game program signals with a base unit to produce a game program bitstream, said base unit then wirelessly transmitting said game program bitstream; and
receiving said game program bitstream by utilizing remote units that each responsively process said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units.

42. A system for implementing an electronic gaming system, comprising:
means for generating game program signals corresponding to a gaming event;
means for processing said game program signals to produce a game program bitstream, said means for processing then wirelessly transmitting said game program bitstream; and
means for receiving said game program bitstream, said means for receiving responsively processing said game program bitstream to retrieve said game program signals, said game program signals including a game video signal, said means for receiving repeatedly performing a pixel identification procedure to individually identify assigned windows from said game video signal, said means for receiving then performing a window zooming procedure to generate remote display video signals from said assigned windows, said means for receiving responsively displaying said remote display video signals upon corresponding remote displays.

43. A system for implementing an electronic gaming system, comprising:
a game console configured to generate game program signals corresponding to a gaming event;
a base unit coupled to said game console for processing said game program signals to produce a game program bitstream, said base unit then wirelessly transmitting said game program bitstream; and
remote units each having a communication manager configured to receive said game program bitstream, said remote units each responsively processing said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units, said base unit including a separate communications unit that is configured with a substantially similar implementation as that of said communication manager.

44. A system for implementing an electronic gaming system, comprising:
  a game console configured to generate game program signals corresponding to a gaming event;
  a base unit coupled to said game console for processing said game program signals to produce a game program bitstream, said base unit then wirelessly transmitting said game program bitstream; and
  remote units configured to receive said game program bitstream, said remote units each responsively processing said game program bitstream to retrieve said game program signals, said game program signals including a game video signal, said remote units each performing a pixel identification procedure to individually identify assigned windows from said game video signal, said remote units then each performing a window zooming procedure to generate remote display video signals from said assigned windows, said remote units each displaying one of said remote display video signals upon respective remote displays coupled to said remote units, said assigned windows being determined based upon system user inputs from game controllers on a first-come first-served basis, said assigned windows being changeable following negotiations between said system users.

* * * * *